United States Patent [19]
Perez

[11] 3,856,487
[45] Dec. 24, 1974

[54] GAS SCRUBBER
[75] Inventor: Manuel Perez, River Vale, N.J.
[73] Assignee: Aerosols Control Corporation, Englewood, N.J.
[22] Filed: Aug. 11, 1972
[21] Appl. No.: 279,848

[52] U.S. Cl................ 55/223, 55/226, 55/228, 55/233, 55/259, 55/481, 55/496, 55/518, 261/DIG. 54, 261/118
[51] Int. Cl............................................. B01d 47/06
[58] Field of Search............ 55/220, 223, 227, 228, 55/475, 481, 515, 226, 259, 496, 518; 261/DIG. 54, DIG. 56, 62, 118

[56] References Cited
UNITED STATES PATENTS

| | | | |
|---|---|---|---|
| 1,358,333 | 11/1920 | Rudloff................................. | 55/475 |
| 1,831,782 | 11/1931 | Strindberg....................... | 55/228 X |
| 2,234,735 | 3/1941 | Lambert et al.............. | 261/DIG. 54 |
| 2,337,983 | 12/1943 | Fisher.......................... | 261/DIG. 54 |
| 2,484,277 | 10/1949 | Fisher.......................... | 261/DIG. 54 |
| 2,523,441 | 4/1950 | McKamy.............................. | 55/223 |
| 2,585,440 | 2/1952 | Collins............................ | 55/228 X |
| 2,873,816 | 2/1959 | Umbricht et al............ | 261/DIG. 54 |
| 3,405,918 | 10/1968 | Calaceto et al.............. | 261/DIG. 54 |
| 3,624,696 | 11/1971 | Cohen................................... | 55/223 |
| 3,753,337 | 8/1973 | Shaw et al. .......................... | 55/233 |

FOREIGN PATENTS OR APPLICATIONS

| | | | |
|---|---|---|---|
| 1,807,803 | 11/1968 | Germany.............................. | 261/62 |
| 1,235,414 | 6/1971 | Great Britain............... | 261/DIG. 54 |

*Primary Examiner*—Bernard Nozick
*Attorney, Agent, or Firm*—Robert A. Maikis

[57] ABSTRACT

A gas scrubber is provided for the removal of particulates and chemical contaminants from air and other gases. The particulates and chemical contaminants are removed from gas drawn through the scrubber, by inertial separation, spraying with water or liquid chemicals, and filtering techniques. A throat section of adjustable cross-sectional area is provided in the scrubber to provide optimum air velocity and turbulence for maximum scrubbing efficiency over a wide range of air handling capacities. A two stage sump is provided for the spray water or liquor to prevent clogging of the spray nozzles. Removable filter baskets of variable depth are utilized during final treatment of the air or gas being cleaned.

8 Claims, 10 Drawing Figures

GAS SCRUBBER

BACKGROUND OF THE INVENTION

1. Field of the Invention

This invention relates generally to pollution control devices and more particularly to an improved gas scrubber for removing particulates and chemical contaminants from air and other gases.

2. Description of the Prior Art

Gas scrubbers are employed to remove pollutants and other undesirable matter from air or other gases. Protection of the earth's environment demands that many different types of contaminants be removed from air or other gases which are vented to the atmosphere from incinerators and various industrial processes. For example, dust and chemical fumes generated by industry must be removed to promote community health. Gas scrubbers are also used in many industrial processes to recover valuable minerals or other air borne materials from waste gases so that the recovered materials may be reused. Finally, gas scrubbers are often employed to treat polluted air from the atmosphere to provide a source of clean air for homes, buildings and sensitive industrial processes.

The pollutants to be removed from air or other gases comprise particulates which are essentially solid materials carried along in the air flow. Examples of this type of pollutants are dust from industrial grinding operations and fly ash from refuse burning. Additionally, the air or gas may contain chemical contaminants such as acid fumes or gases which are produced during chemical processes. Particulates and gaseous or liquid pollutants entrapped in the air are removed in prior art gas scrubbers by a wide variety of techniques. The particulates, for example, are often removed by inertial separation which results when an air stream moving at a relatively high velocity is suddenly changed in direction to expel the particulates by centrifugal force. Sprays of water or various liquid chemicals are injected into the air stream to remove chemical gases and liquid particles carried along in the stream. The sprays effectively "wash" the air and eliminate the undesirable chemicals by adsorption or chemical reaction with the liquid being sprayed. Finally, filters of various materials are employed for removal of various types of pollutants.

The presently known types of gas scrubbers generally are designed and built for specific applications and are constructed for a particular range of air flows. When the rate of air flow or the volume handled is changed for a particular scrubber, the scrubber usually must be modified to handle the different air flow parameters with maximum cleaning or scrubbing efficiency. Consequently, any change in the process in which the gas scrubber is employed may result in costly and time-consuming modifications being made to the gas scrubber itself. Additionally, gas scrubbers using water or chemical sprays to wash the gas or air being treated are subject to periodic shut downs because the nozzles which spray the water or liquid chemicals become clogged with the pollutants trapped in the spray. Filters employed in known gas scrubbers are also subject to the requirement of frequent cleaning and other servicing to maintain a peak operating efficiency for the gas scrubber unit. Finally, it is desirable that all gas scrubbing equipment have low power and water requirements, be self-contained, mechanically-rugged and be of compact size and weight.

SUMMARY OF THE INVENTION

It is an object of this invention to provide a gas scrubber which is readily adapted for applications having a wide range of gas flow rates and which may be easily modified in the field to suit a wide range of applications.

It is a further object of this invention to provide a gas scrubber having a novel, two-stage sump arrangement which minimizes nozzle clogging and shut-down time.

It is a still further object of this invention to provide a gas scrubber having a filter arrangement which provides for easy maintenance of the filter media and for adjustment of the depth of the filter media.

It is another object of this invention to provide a gas scrubber having no moving parts and which is of mechanically rugged construction.

It is an additional object of this invention to provide a gas scrubber having low power and water usage requirements and which is of compact size and weight.

Briefly, the gas scrubbing apparatus of the invention comprises a housing having a gas inlet and a gas outlet. Baffle means in the housing form a passageway connecting the gas inlet with the gas outlet. The passageway is provided with an adjustable throat portion having a reduced cross-sectional area and spray means are disposed in the throat portion to produce a liquid spray across the throat portion, so that gas passing through the throat portion from the gas inlet to the gas outlet is increased in velocity and turbulence and scrubbed by the liquid spray. In one embodiment of the invention, the throat portion of the passageway comprises the space between a substantially coplanar movable baffle and a substantially coplanar fixed baffle. In another embodiment of the invention, one baffle of the said movable and fixed baffles is substantially coplanar and the other baffle has two portions, each of which is substantially coplanar, which are inclined at an acute angle with the plane of said one baffle, so that the cross-sectional area of the throat portion formed by the baffles gradually tapers to a minimum at the apex of the two inclined portions of the said other baffle, to thereby provide a smooth transition from the larger cross-sectional area of the passageway to the smaller cross-sectional area of the throat portion. In still another embodiment of the invention, the housing of the gas scrubber is provided with a liquid-filled sump portion and means are provided for controlling the level of the liquid in the sump portion. In this embodiment, a fixed baffle is disposed above the surface of the liquid in the sump portion and the throat portion of the passageway is formed by the space between the fixed baffle and the surface of the liquid in the sump portion.

The sump portion of the housing of the gas scrubber of the invention may be divided into two sections or "stages" by a filter. One of the sump sections is disposed beneath the throat area of the passageway in the housing, so that the heavy particulate matter and contaminants in the gas being scrubbed fall into the said one section of the sump. The other section of the sump is utilized as the source of liquid for the spray nozzles in the housing, so that the filtered liquid drawn from the said other section of the sump prevents clogging of the spray nozzles. Additionally, removable filter baskets may be disposed in the passageway in the housing adjacent the gas outlet of the housing to provide one or more final treatments for the gas passing through the scrubber.

The nature of the invention and other objects and additional advantages thereof will be more readily understood by those skilled in the art after consideration of the following detailed description taken in conjunction with the accompanying drawings.

DESCRIPTION OF THE PREFERRED EMBODIMENT OF THE INVENTION

Figure 1:
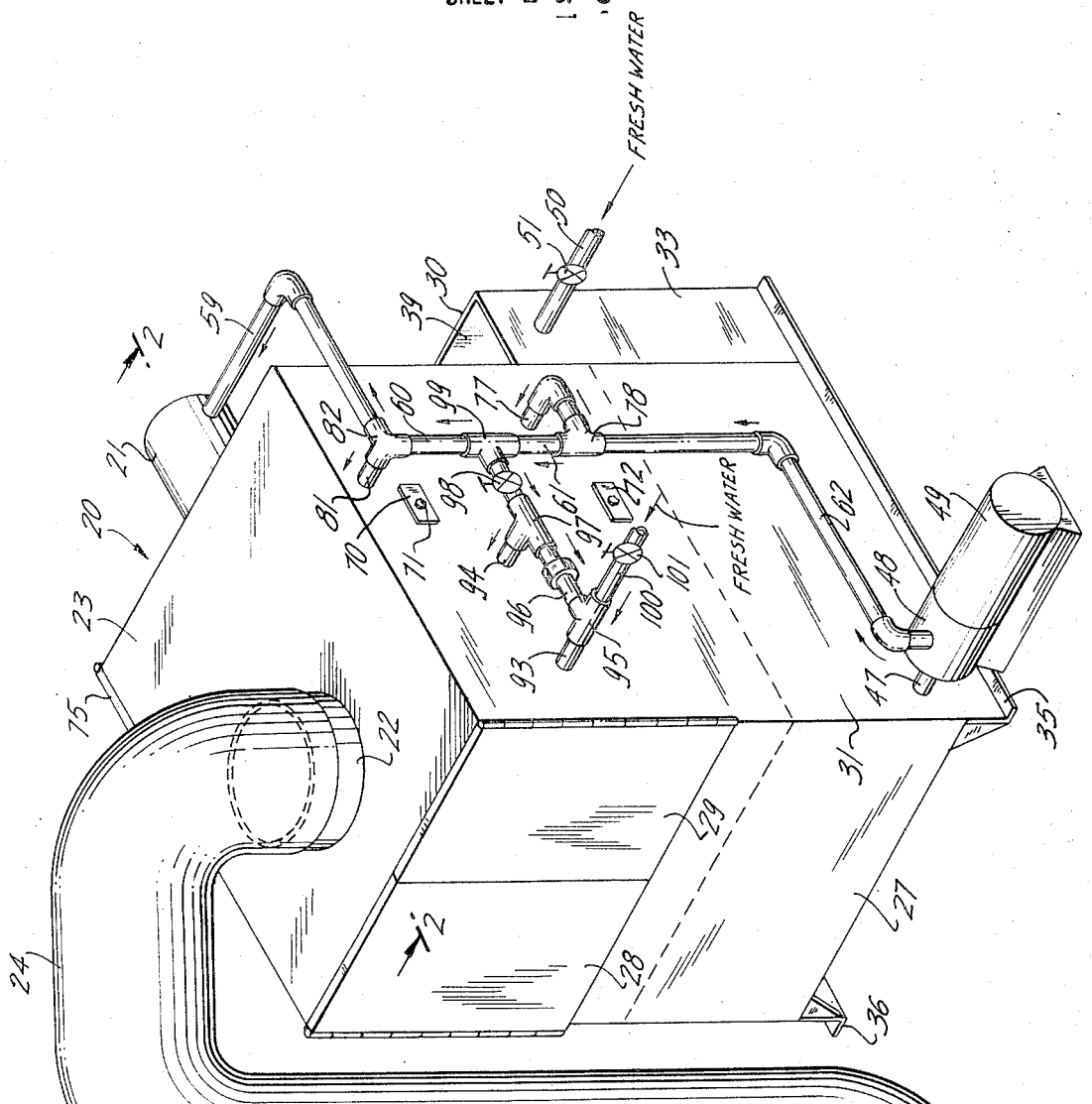
FIG. 1 is a perspective view of a gas scrubber constructed in accordance with the teachings of the present invention.

Referring now to FIG. 1 of the drawings, there is shown a gas scrubber constructed in accordance with the teachings of the present invention. The gas scrubber has a housing 20 which is provided with an air inlet duct 21. The inlet duct 21 is adapted to be connected to a source of polluted or dirty air or other gas. For example, when the combustion products of refuse burning or incineration are to be treated, the inlet duct 21 may be directly connected to the flue of the incinerator. The combustion products are then passed through the gas scrubber 20 and the clean air is drawn out of an outlet duct 22 located on the top 23 of the gas scrubber. As illustrated in FIG. 1, the outlet duct 22 is connected by a duct 24 to a blower or air handler 25 which serves to physically draw the air through the gas scrubber from the inlet duct 21. In the previously mentioned example, where the inlet duct is connected to the flue of an incinerator, the blower 25 may have its outlet 26 connected back to the flue for venting to the atmosphere or may be connected to a separate venting arrangement. Although the gas scrubber of the invention will be described with reference to the removal of pollutants from air, it will be understood that it may be employed to remove pollutants or other undesirable contaminants from any gas. Accordingly, the inlet duct 21 may, for example, be connected to the waste gas output from a chemical process and the outlet 26 of the blower 25 connected to a stack or other venting arrangement for venting to the atmosphere. The housing 20 of the gas scrubber and the inlet and outlet ducts should preferably be constructed of a material which will not chemically react with the pollutants in the air or gas being treated. Accordingly, the housing and the hereinafter described interior parts of the scrubber may be constructed, for example, of a 12 gauge mild steel, stainless steel, a glass fiber material or a plastic such as polyvinyl chloride.

Figure 2:
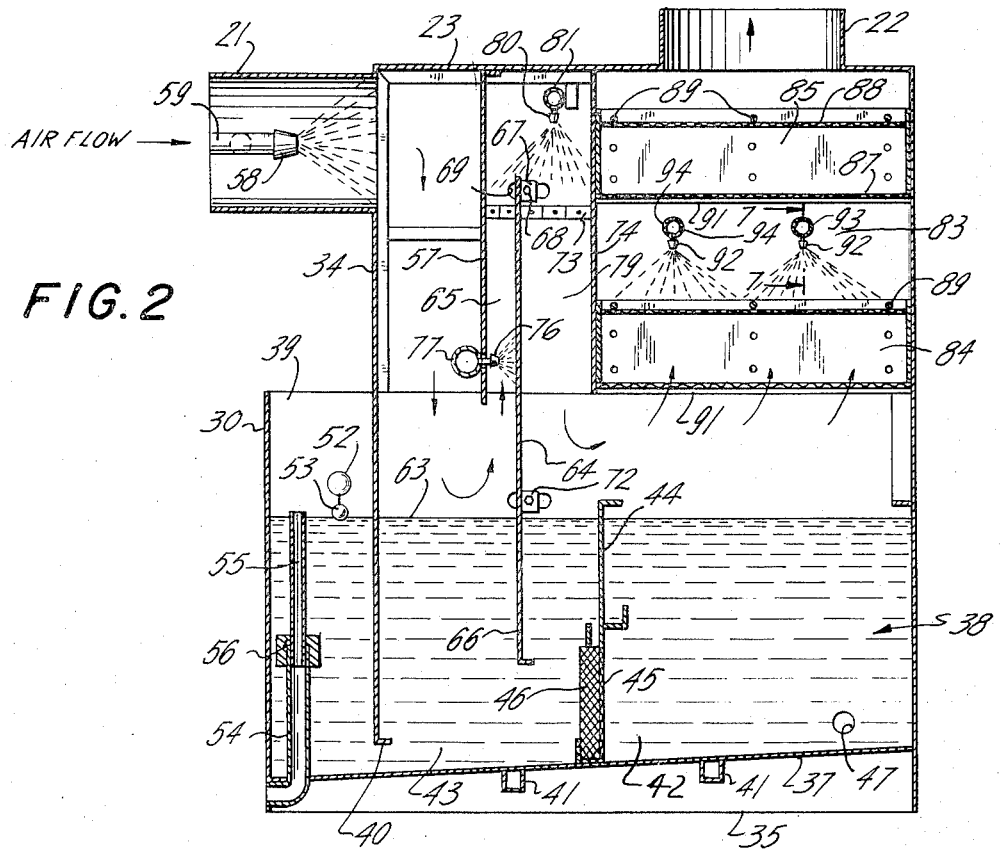
FIG. 2 is a full sectional view of the gas scrubber taken along the line 2—2 in FIG. 1 of the drawings.
Figure 4:
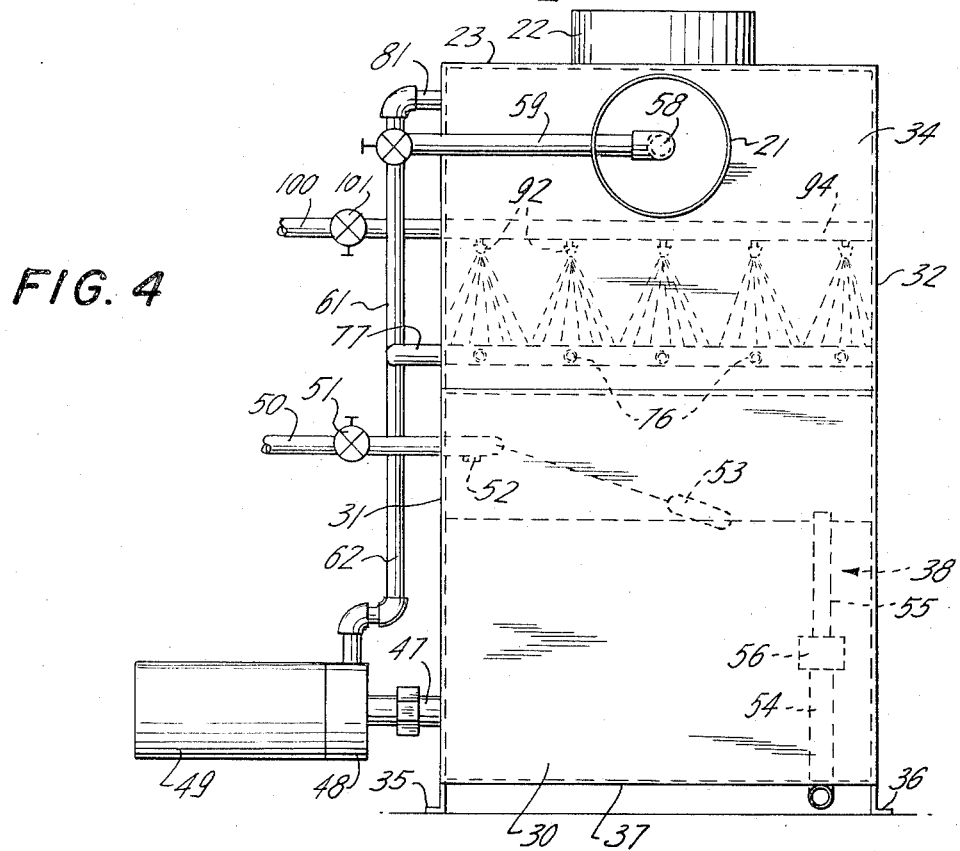
FIG. 4 is a rear elevational view of the gas scrubber shown in FIGS. 1-3 of the drawings.
Figure 5:
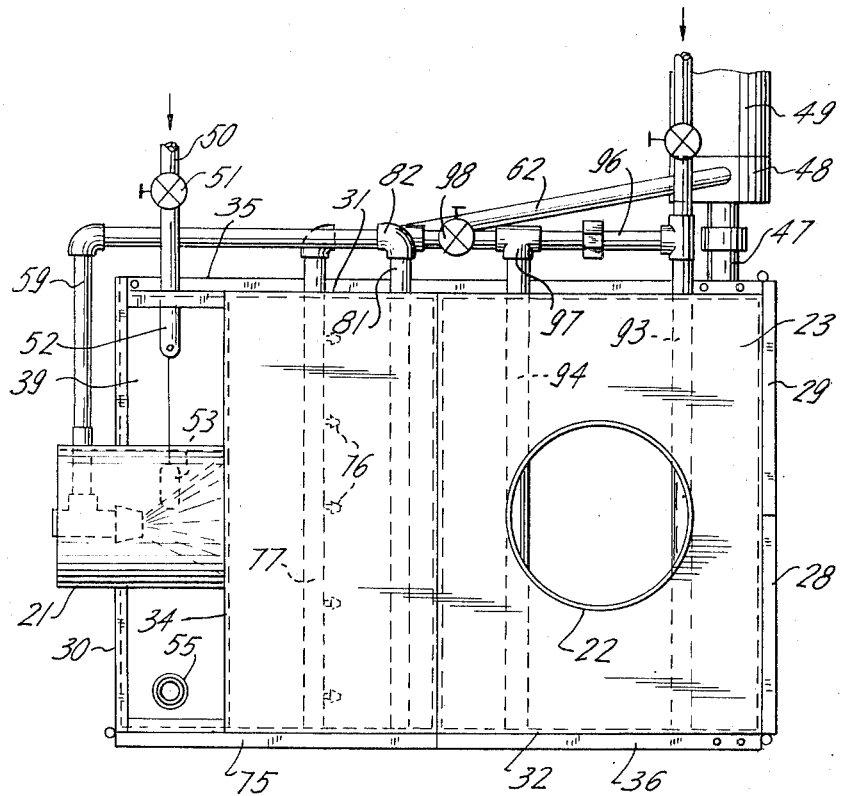
FIG. 5 is a plan view showing the top of the gas scrubber of FIGS. 1-4 of the drawings.

The housing 20 has a front panel 27 in which a pair of outwardly opening service doors 28 and 29 are provided for purposes hereinafter described. As seen in FIGS. 2, 4 and 5 of the drawings, a rear wall 30 is provided which does not extend the full height of the unit. Side panels 31 and 32 are connected by means such as welding, for example, to the top 23, the front panel 27 and the rear panel 30 to provide a basic box-like enclosure. The side panels 31 and 32 are each provided with an extended portion 33 of approximately the same height as the rear panel 30, to which the rear panel 30 is connected. A panel 34 to completely enclose the top of the unit. The side panels 31 and 32 are respectively provided with flanges or "feet" 35 and 36 upon which the unit rests. A rectangular floor 37 is connected by means such as welding, for example, to the front panel 27, the rear panel 30 and the two side panels 31 and 32 to form a liquid-tight enclosure or "sump" 38 in the lower portion of the housing 20. The aforementioned construction provides an opening 39 between the rear wall 30 and the panel 34 through which access to the sump 38 may be had. The floor 37 is arranged to slope downwardly toward the rear panel 30 so that relatively heavy particulate matter or other contaminants removed from the air during the scrubbing process settle in the sump and flow downwardly toward the end panel 30. It will be noted in FIG. 2 of the drawings that the panel 34 in the rear of the unit does not extend down the full length of the unit to reach the floor 37, so that a rectangular opening 40 exists through which the "sludge" accumulating in the sump 38 is permitted to flow toward the end panel 30. The accumulated sludge may be conveniently removed through the previously described opening 39. Reinforcing members 41 are connected between the side panels 31 and 32 underneath the floor 37 to provide added strength to bear the weight of the liquid in the sump 38.

As seen in FIG. 2 of the drawings, the sump 38 is divided into two sections or stages 42 and 43 by a vertical wall or member 44 which is connected between the side walls 31 and 32 of the unit. The wall 44 is provided with an opening 45 at the lower end thereof in which a screen or filter 46 is disposed, so that liquid in the sump is free to pass from one stage to the other stage but heavy particulate matter or sludge is prevented from entering the sump section 42. Again, the interior of the housing, the wall 44 and the filter 46 are preferably fabricated of a material which does not chemically react with the liquid in the sump or the contaminants removed from the air being treated. It will be noted that the section 42 of the sump is located at a higher elevation than the sump section 43 because of the inclined floor 37 of the housing. The sump section 43 is disposed beneath the portion of the interior of the gas scrubber which first receives the untreated air from inlet duct 21, so that it is this section of the sump which receives the largest amount of heavy particulates and other contaminants. The filter 46 in the wall 44 prevents these large particles from entering sump portion 42. An outlet pipe 47 is connected to the higher elevation end of sump section 42 and communicates with the input of a pump 48 which is located outside of the housing 20. The pump 48 is driven by an electric motor 49 so that the liquid in the sump 38 may be used in the various spray sections of the unit which will be described hereinafter, thereby providing a "closed" or recirculating spray system. The sump 38 is initially filled by fresh water or other liquid from a pipe 50 having a valve 51 located therein. This inlet pipe communicates with the sump section 43 through housing wall 31 and is provided with a float valve 52 and a float 53 so that the liquid in the sump may be maintained at a predetermined level. A surface drain pipe or "skimmer" 54 is located at the low elevation end of sump 38 to act as a safety device to prevent over-filling of the sump in case the float valve 52 becomes inoperative. The skimmer 54 is connected to an upper pipe section 55 by a threaded connector 56, so that the overall height of the drain pipe may be altered to control the level of the liquid in the sump. It may be noted that the surface drain arrangement may also be utilized to skim surface "froth" or contaminants from the surface of the liquid in the sump 38.

As seen in FIG. 2 of the drawings, the dirty or untreated air is drawn through inlet duct 21 by the action of the blower 25 and is immediately deflected in a downward direction by a fixed baffle 57 which is connected to the top 23 and side wall 31 of the scrubber housing. As the untreated air passes through inlet duct 21, a nozzle 58 provides a quenching spray which tends to cool the untreated air and thereby reduce its volume for easier handling by the gas scrubber. The spray from nozzle 58 also tends to agglomerate the particulate matter and other contaminants in the untreated air into heavy particles which fall into the sump section 43. The nozzle 58 communicates directly with the output of the pump 48 by means of pipes 59, 60 61 and 62, so that the liquid in the sump 38 is pumped directly into the nozzle 58 to produce the agglomeration spray. The liquid in the sump may be water or may comprise various liquid chemicals which are used for treating chemical contaminants in the dirty air. For example, if the principal pollutant being treated is a phenol compound, the sump liquid could comprise a liquid solution of potassium permangenate which is employed to oxidize the phenol compounds in the air. If the untreated or dirty air contained acid fumes, the sump solution might be a caustic solution which would neutralize and remove the acid fumes. Accordingly, the chemical composition of the liquid in the sump which is employed for the agglomeration nozzle 58 is determined by the nature of the pollutants being treated.

After the air passes through the agglomeration spray and is directed downwardly by the fixed baffle 57, it strikes the surface 63 of the liquid in the sump and then strikes a movable baffle 64, so that is is completely reversed in direction and passes through a "throat" 65 formed by the fixed baffle 57 and the movable baffle 64. This 180° reversal in direction of air flow acts to remove relatively heavy contaminants or particulate matter, such as grinding dust, for example, by inertial separation. Since the particulate matter is heavier than the air and water droplets, the centrifugal force acting upon these particles produces a greater force on the particulate matter which is then directed downwardly into the sump liquid. The air and any fine or lightweight particles in the air, however, pass upwardly through the throat 65. It may also be noted that some inertial separation occurs when the untreated air enters the inlet duct 21 and is deflected 90° downwardly by the action of fixed baffle 57. The separated particulate matter in this section would tend to collect on the baffle 57 and is washed into the sump section 43 by the action of the spray from nozzle 58.

The baffle 64 is movable for reasons which will be hereinafter described and is made of sufficient length so that the lower end 66 thereof is well below the surface 63 of the liquid in the sump. The top of the baffle is secured to a bracket 67 which has a bolt 68 passing therethrough. The bolt 68 passes through a slot 69 formed in the side wall 31 of the scrubber housing and through an aperture in a cover plate 70 disposed on the outside of the housing. A nut 71 is provided on the end of the bolt 68 so that the bracket 67 may be clamped in place at some point along the length of the slot 69. The cover plate 70 prevents the escape of untreated air to the exterior of the scrubber housing. A similar bracket and slot arrangement, indicated generally by reference numeral 72, is provided at a lower point along the length of the movable baffle 64 which is above the surface 63 of the liquid in the sump, so that the movable baffle is supported on one side thereof by the housing wall 31. The other side of the movable baffle is supported by a lock bar arrangement 73 which is connected between the fixed baffle 57 and a baffle-wall member 74. The lock bar 73 passes through an aperture formed in the movable baffle 64 and the baffle is held in place on the lock bar by washers and nuts (not shown) on the rod so that lateral adjustment of the baffle may be made. The lock bar arrangement is utilized because a service door 75, as shown in FIGS. 1 and 5 of the drawings, is provided in the housing side wall 32 to permit the air inlet and throat sections of the scrubber to be cleaned and serviced when required. Consequently, the top of the movable baffle 64 which is adjacent the side wall 32 may not be connected to the side wall by a bracket and slot arrangement. The lower end of the movable baffle, however, may be connected by a suitable bracket and slot arrangement (not shown) to the side wall 32, so that the movable baffle may be laterally adjusted and locked in place at a desired position.

As the air to be treated passes through the throat 65 formed by the fixed baffle 57 and the movable baffle 64, it passes through a liquid spray from a row of nozzles 76 which are spaced at predetermined points along the length of a pipe 77. The pipe 77 is horizontally disposed so that a horizontal spray is set up across the entire width of the passageway 65. The pipe 77, as seen in FIG. 1 of the drawings, is connected by a tee fitting 78 and the pipe 62 to the output side of pump 48 so that the liquid in the sump is forced out through the nozzles 76. It may be noted that a thin slot or opening may be formed in the pipe 77 running the length thereof to provide the liquid spray instead of utilizing the row of nozzles 76. The use of such a slot would essentially provide a solid jet or "curtain" of liquid running completely across the throat 65 and may be desirable for some applications.

The adjustable or movable baffle 64 permits the cross-sectional area of the throat portion 65 to be adjusted to produce optimum scrubbing conditions. As the cross-sectional area of this portion of the passageway is gradually narrowed, the velocity of the air passing through the passageway is speeded up and a turbulence is created which greatly aids the scrubbing action caused by the liquid spray from nozzles 76. In general, the adjustment of the baffle will depend on the rate of flow of the air being treated and the scrubbing efficiency required. As the baffle is moved closer to the fixed baffle 57, the Reynolds Number of the flow is increased and consequently a high turbulence is created which produces a good mixing action between the air being treated and the fine droplets of water or liquid chemicals forming the spray from nozzles 76. This thorough scrubbing action effectively eliminates the fine particulate matter and other chemical contaminants which the first stages of the scrubbing process miss. Additionally, since the row of nozzles 76 are aimed substantially horizontally to produce a spray pattern which strikes movable baffle 64, the spray will bounce back and forth several times between the movable baffle 64 and the fixed baffle 57, so that extremely fine droplets of the liquid spray are produced. The high velocity of the air passing through the throat 65 effectively produces gas stream atomization, since these very fine droplets of liquid are sheared by the high velocity air into micron-sized droplets. Again, this action materially increases the efficiency of the scrubbing process. In effect, the movable baffle 64 permits the "throat" area 65 to act as a single dimensional Venturi. This feature also allows a single size of gas scrubber to accomodate a wide variation in the flow rate of the air being treated, so that a unit in the field may be switched over to different processes or uses without expensive and time consuming structural modifications. The disclosed variable throat arrangement also provides a longer "residence" time for the air in the scrubber to thereby promote a more complete and thorough chemical reaction of the pollutants with the liquid spray. The width of the throat portion 65 may vary from about 1 inch to 5 inches, where the 5 inch size would be used for a flow rate of about 5,000 CFM. It will be apparent that if the movable baffle 64 is moved too close to the fixed baffle 57, the velocity of the air will be increased to a very high rate, but at the same time a large pressure drop will be created through the throat area which will impose a substantial load on the blower 25. Accordingly, as mentioned previously, the setting of the size of the throat area will be determined by the parameters of the process or field of application for which the scrubber is used.

When the air leaves the throat portion 65 of the passageway, it passes around the top edge of the movable baffle 64 and strikes the top 23 of the scrubber housing. It then strikes fixed baffle or wall member 74 and is directed downwardly through a passageway 79 until it strikes the surface 63 of the liquid in the sump section 43. By virtue of this arrangement, the direction of the air flow in the passageway 79 is completely reversed from the direction of the air flow in the throat 65, so that another inertial separation is performed thereby removing more particulate matter. As the air is reversed in direction at the upper portion of the passageways 65 and 79, it is passed through another curtain of spray formed by a row of nozzles 80 which are disposed along the length of a horizontally extending pipe 81. The pipe 81, as seen in FIG. 1 of the drawings, is connected by means of a tee fitting 82 and pipes 60, 61 and 62 to the output side of pump 48 so that the liquid from the sump section 42 is forced through the nozzles 80 to create the spray. This spray agglomerates the fine contaminated water droplets which are then dropped out in the sump by the inertial forces involved in reversing the direction of air flow. As the air leaves passageway 79, it strikes the surface 63 of the liquid in sump section 43 and is then drawn upwardly through a passageway 83 which is formed by the wall member 74 and the front wall 27 of the scrubber housing. This passageway communicates directly with the gas outlet duct 22. Again, the direction of the air flow in passageway 83 is opposite to the direction of the air flow in passageway 79, so that another inertial separaion of particulate matter is performed. It will be noted that any remaining heavy particulate matter which accumulates on the walls of passageway 79 is washed down into sump section 43, so that these large particles accumulate with the other sludge material in the sump portion in which the float valve 52 is located. Since this sump section is separated by the screen or filter 46 from the sump section 42, only relatively clean liquid is passed through the outlet pipe 47 to the input of pump 48. By virtue of this arrangement, the heavy particulate matter and other contaminants are prevented from entering the spray pipes and clogging the nozzles in the scrubber, thereby minimizing maintenance and shut-down time.

Figure 3:
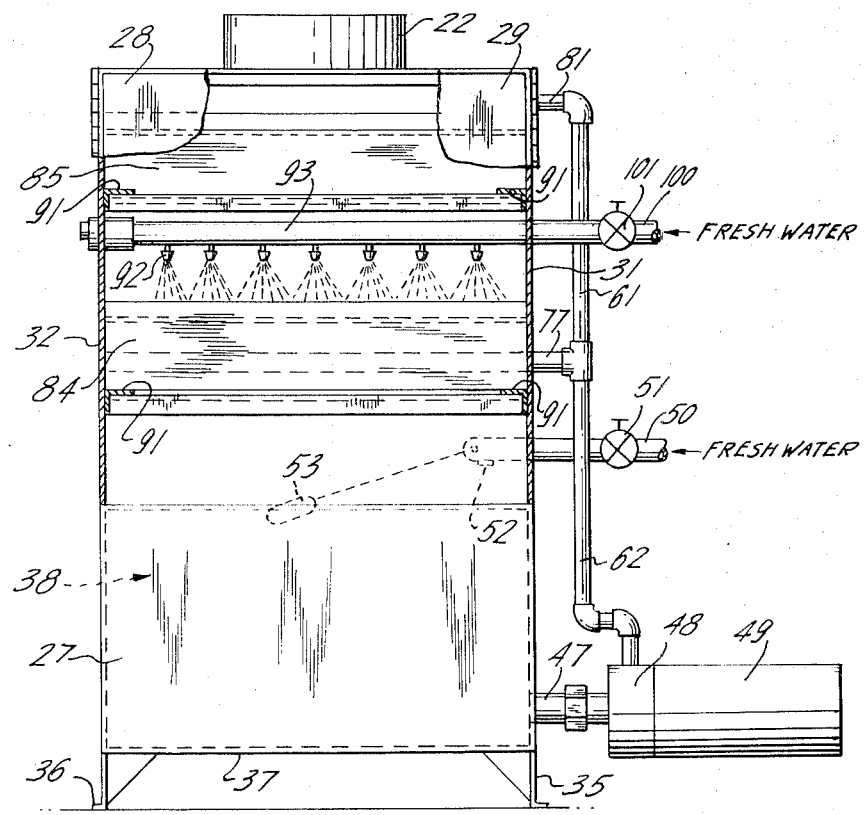
FIG. 3 is a front elevational view of the gas scrubber of FIG. 1 with portions of the service doors broken away to reveal details of construction.
Figure 6:
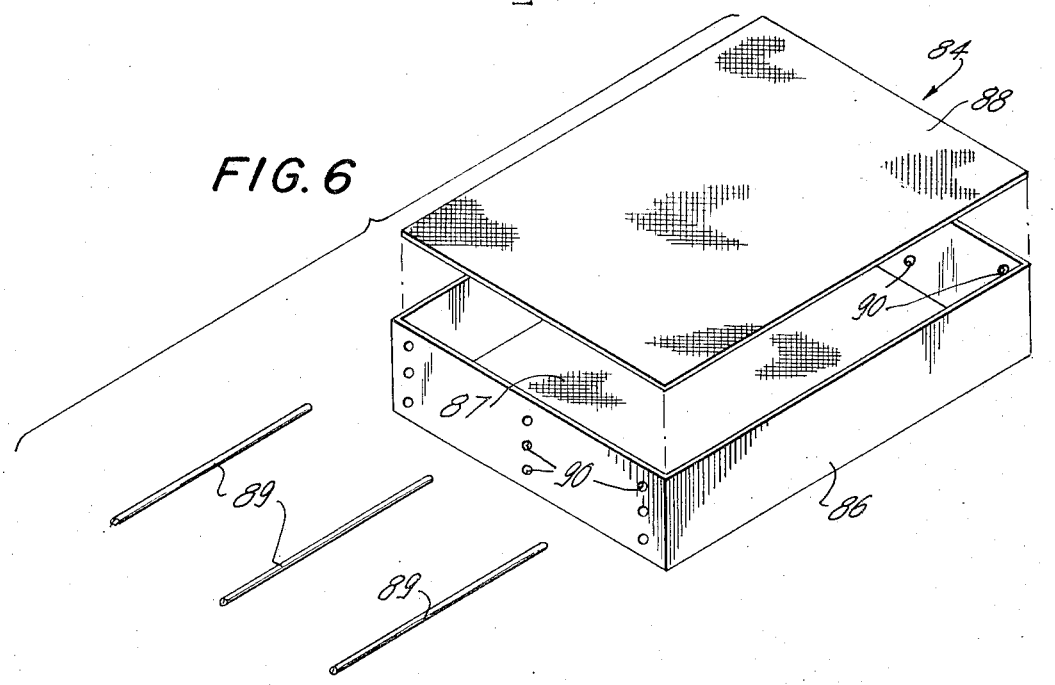
FIG. 6 is a perspective view of one of the filter baskets of the gas scrubber of the invention with the support rods and top screen removed for convenience of illustration.

The passageway 83 is a two stage filtering section which is composed of a first filter basket 84 and a second filter basket 85. The construction of each of the filter baskets 84 and 85 is identical and is shown in FIG. 6 of the drawings. As seen in FIG. 6, each filter basket comprises a substantially rectangular hollow frame 86 which is closed at the bottom by a gas permeable end member 87. The end member 87 should be fabricated of screen or mesh material, so that the filter material or media is held in place in the basket but gas or air is allowed to pass through. The filter media (not shown) is packed in the basket formed by frame 86 and bottom 87 and a mesh or screen cover member 88 is placed on top. The cover member 88 is held in place by three rods 89 which are inserted in apertures 90 formed in the front and rear side panels of the frame 86. The rods 89 pass through the openings 90 and then pass over the top of the cover member 88, so that the air pressure caused by the air passing from the bottom to the top of the filter will not dislodge the contents. As illustrated, the openings 90 are disposed vertically along the frame 86, so that the amount or thickness of filter media in each filter basket can be varied to suit a particular application. Since the thickness of the filter media can be controlled, the pressure drop through this section of the gas scrubber can be adjusted to suit particular applications. This feature also enables the gas scrubber of the invention to be readily modified in the field to suit changes in process or application. The filter baskets are preferably constructed of materials which will not react with the scrubbing liquor in the sump 38 or the chemical contaminants in the air being treated. For example, the baskets may be fabricated of the stainless steel, glass fiber or plastic materials which form the rest of the scrubber unit. As seen in FIGS. 2 and 3 of the drawings, the filter baskets 84 and 85 are slidably supported on channels or brackets 91 which extend horizontally along the housing side walls 31 and 32. Then the service doors 28 and 29 of the housing are opened, both filter baskets may be remove from the passageway 83 for servicing as required.

Figure 7:
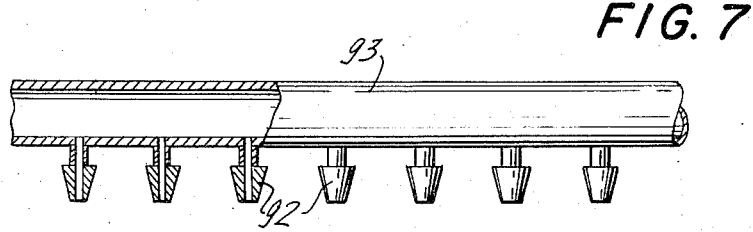
FIG. 7 is a side elevational view, partly in section, of the nozzle and pipe arrangement employed to produce the liquid sprays in the gas scrubber of the invention.

The filter basket 84 may be filled with a filter material or media, such as beryl saddles, pall rings or tellerettes, for example. This filter stage provides an additional scrubbing and filtering action to remove very fine particles and contaminants in the air being treated. Two rows of horizontally-disposed nozzles 92 are provided directly above filter basket 84. One row of nozzles is provided along the length of a horizontally-disposed pipe 93, while the second row of nozzles is similarly disposed along the length of a pipe 94. Pipe 93 and the row of nozzles 92 connected thereto are shown in detail in FIG. 7 of the drawings. The same spray arrangement may also be employed for the previously-described nozzles 76 and 80.

As seen in FIG. 1 of the drawings, the pipe 93 is connected by a tee fitting 95, a coupling 96 and a second tee fitting 97 to one side of a valve 98. The other side of valve 98 is connected to a tee fitting 99 which is coupled by means of pipes 61 and 62 to the output of pump 48, so that when valve 98 is opened, the liquid in the sump 38 is pumped to both rows of the nozzles 92. The downward spray from the two rows of nozzles 92 provides an additional scrubbing action and also washes dropped-out particulates from the filter media in the basket 84 into the sump section 42. The direction of the spray from nozzles 92 is opposite to the direction of the air flow in passageway 83 to produce countercurrent mass transfer action for high efficiency scrubbing. If desired, the liquid sprayed from nozzles 92 may be fresh water. To this end, a pipe 100 having a valve 101 therein is connected to a fresh water supply (not shown) and to the tee fitting 95, so that the fresh water from the supply source is connected to both pipes 93 and 94 by the tee fitting 95 and the pipe coupling 96. Accordingly, when valve 98 is closed and valve 101 is opened, the liquid from the sump is prevented from entering the pipes 93 and 94 and the fresh water supply is connected thereto.

After the air leaves filter basket 84 and the spray curtain from nozzles 92, it passes through the second filter basket 85 which acts primarily as a mist eliminator. The second filter basket may be filled with media, such as packing materials or wire mesh, for example, so that the fine droplets of moisture in the treated air will coalesce on the filter media and drop into the sump section 42 of the gas scrubber. If desired to suit a particular application, all or part of the filter media for the second basket 85 may consist of material such as activated charcoal which eliminates residual odors in the treated air. The thickness or depth of filter material in the second basket 85 may also be controlled in the same manner as the material in basket 84, so that the pressure drop in the filter section of the scrubber can be controlled to suit the requirements of a particular application. It is believed readily apparent that both filter baskets are easily removed from the gas scrubber unit, so that the filter media may be cleaned or changed to suit the requirements of a particular application. This feature also permits the gas scrubber of the invention to be readily modified in the field when the requirements of a process are changed.

Figure 8:
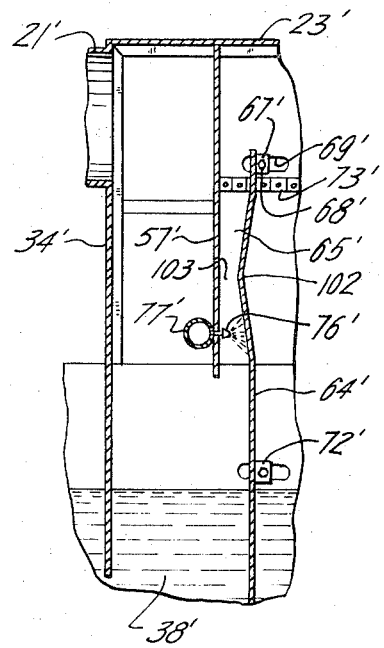
FIG. 8 is a sectional view of the throat portion of the gas scrubber of the invention showing an alternative movable baffle construction.

An alternative movable baffle arrangement for the gas scrubber of the invention is shown in FIG. 8 of the drawings. In describing this embodiment of the invention, reference characters with a prime notation will be employed to describe parts which are the same as or similar to correspondingly numbered parts in the embodiment of FIGS. 1 through 7 of the drawings. As seen in FIG. 8, the throat portion 65' of the passageway in the housing is again formed by a fixed baffle 57' and a movable baffle 64'. In this embodiment of the invention, the movable baffle 64' is formed with two substantially coplanar portions which are inclined at an acute angle to the plane of the fixed baffle 57'. The inclined movable baffle portions slope towards the fixed baffle 57' until they reach the apex 102, at which point the passageway 65' is narrowed down to a very small cross-sectional area 103. This configuration provides a gradual and smooth transition from the larger cross-sectional area of the passageway in the housing to the smaller cross-sectional area 103 of the throat portion 65'. The smoother transition provided yields a lower overall pressure drop for this section of the gas scrubber and provides a somewhat greater scrubbing action at lower levels of energy consumption. The movable baffle 64' in this embodiment of the invention is supported in exactly the same manner as the movable baffle 64 in the embodiment of the invention shown in FIGS. 1 through 7 of the drawings. In all other respects, this embodiment of the invention operates in exactly the same manner as the previously-described embodiment.

Figure 10:
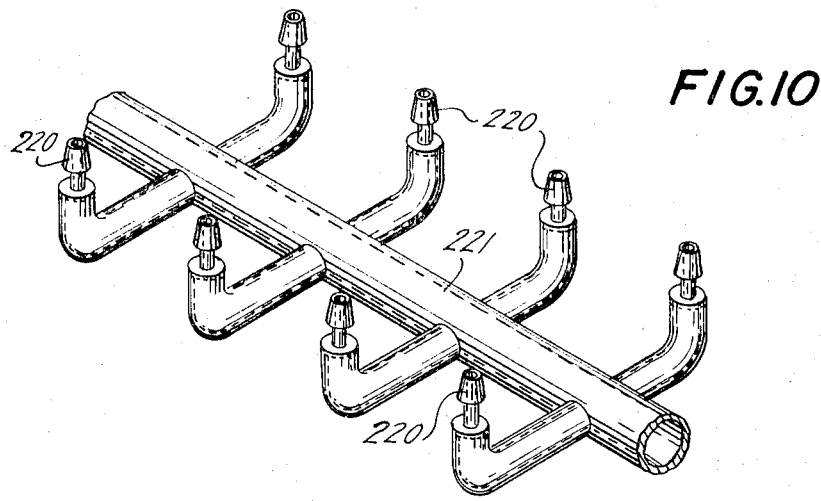
FIG. 10 is a perspective view of the nozzle and pipe arrangement employed to irrigate the filter baskets in the embodiment of the invention shown in FIG. 9 of the drawings.
Figure 9:
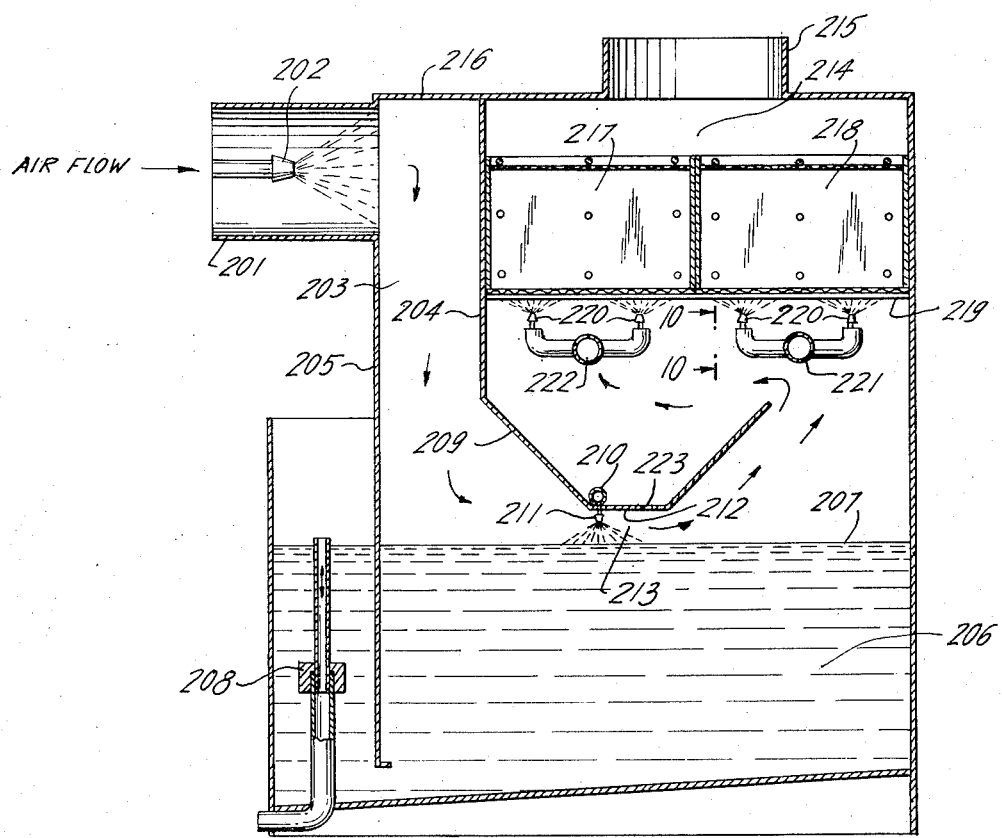
FIG. 9 is a side full sectional view of a gas scrubber constituting an alternative embodiment of the invention.

Another alternative embodiment of the invention is shown in FIGS. 9 and 10 of the drawings. In this embodiment, the variable Venturi or throat section of the scrubber is formed by a fixed baffle and the surface of the liquid in the sump. As seen in FIG. 9, the air to be treated enters an inlet duct 201 and passes through an agglomeration spray from a nozzle 202. After passing through the agglomeration spray, the air is deflected downwardly through a passage 202 formed by a fixed baffle 204 and the rear wall 205 of the housing. The housing is formed in substantially the same manner as the housing shown in FIGS. 1 through 7 of the drawings and is provided with a liquid-filled sump area 206. Although not illustrated, it will be understood that a two-stage sump portion may be employed in place of the single-stage sump shown in FIG. 9 if desired. The level of the surface 207 of the liquid in the sump may be controlled by an adjustable surface drain arrangement 208 and by a float valve (not shown) in the same manner as the previously-described embodiments of the invention. The fixed baffle 204 is provided, at the lower end thereof, with a "c-shaped" portion 209 which extends from side wall to side wall of the housing. A horizontally-extending pipe 210 having a row of nozzles 211 spaced along the length thereof is mounted on the lower edge or apex 212 of the baffle 209, so that a substantially vertical curtain of liquid spray is formed across the opening 213 which is formed by the apex 212 of the baffle and the surface 207 of the liquid in the sump.

Accordingly, as the untreated air is drawn through the passageway 203 by the action of the blower (not shown), the area of the passageway is gradually narrowed down until it reaches the relatively small cross-sectional area or throat 213 which is formed by the curved portion 209 of the baffle and the surface 207 of the liquid in the sump. At this point, the smaller cross-sectional area causes the velocity of the air to be substantially increased to that the Reynolds Number and turbulence are increased to provide optimum atomization of the spray from the nozzles 211. As the atomization of liquid particles is increased by the high velocity of the air passing through the throat, the scrubbing efficience is increased together with the pressure drop through the unit. The high velocity of the air stream through the throat 213 tends to atomize both the liquid from the spray nozzles 211 and the liquid which is sheared off from the surface of the sump. In this arrangement, the cross-sectional area of the throat 213 may be easily controlled by means of the adjustable surface drain 208 or the float valve (not shown). When the gas scrubber is employed in a process having a relatively low rate of air flow, the water level in the sump may be raised to produce the high velocity needed for good scrubbing action. Similarly, when the scrubber is used in an application having a relatively high rate of air flow, the water level may be lowered to produce the same optimum velocity.

After the scrubbed air leaves the throat portion 213 of the scrubber, it passes through a passageway 214 which is connected to an outlet duct 215 mounted on the top 216 of the scrubber housing. The filter section in passageway 214 consists of two removable filter baskets 217 and 218 which may be constructed in the same manner as the filter baskets employed in the embodiment of FIGS. 1 through 7 of the drawings. Both filter baskets are slidably mounted on horizontally extending brackets 219 which are secured to the side walls of the scrubber housing. Since the baskets are mounted side by side in the output passageway 214, they may each be filled with the same filter media and may, if desired, be replaced by a single large basket. The undersides of the baskets 217 and 218 are irrigated by the liquid spray from four horizontally-extending rows of nozzles 220 which are connected to pipes 221 and 222. The pipe 221 and nozzles 220 mounted thereon are shown in detail in FIG. 10 of the drawings wherein it is seen that two rows of the nozzles 220 are supplied by a single one of the pipes 221 and 222. The pipes 221 and 222 may be connected to the water or liquor in the sump 206 by piping (not shown) or may be connected directly to fresh water, if desired. The spray produced by the nozzles 220 provides a further scrubbing action to remove fine particles from the air entering the output passageway 214 and also serves to irrigate the undersides of the filter baskets 217 and 218 to remove particulates and other matter which accumulates in the filter section. A row of apertures or holes 223 is provided across the length of the apex portion 212 of the baffle 204 so that water or other liquid falling down into the depression formed by the curved lower end of the baffle may pass through the apertures and back into the sump 206 of the unit. The liquid dripping through the holes 223 also forms a curtain of liquid drops across the throat area 213 and is atomized by the high velocity air passing therethrough to further increase the scrubbing efficiency of the unit. This embodiment of the invention may, if desired, also be provided with a two stage gas filter section in the output passageway 214 and with additional spray means for greater scrubbing action. Similarly, inertial separation sections may also be added for further operating efficiency.

It is believed apparent that many changes could be made in the construction and described uses of the foregoing gas scrubber and many seemingly different embodiments of the invention could be constructed without departing from the scope thereof. For example, the configuration of the various passageways and sections in the gas scrubber could be changed in design and still provide the basic scrubbing and filtering actions required. Accordingly, it is intended that all matter contained in the above description or shown in the accompanying drawings shall be interpreted as illustrative and not in a limiting sense.

What is claimed is:

1. Gas scrubbing apparatus comprising
   a housing having a gas inlet and a gas outlet;
   baffle means in said housing forming a passageway therethrough connecting the gas inlet and the gas outlet, said baffle means comprising fixed baffle means connected to said housing and at least one movable baffle spaced from said fixed baffle which defines with said fixed baffle means an adjustable throat portion of reduced cross-sectional area in said passageway; means for adjusting said movable baffle;
   spray means disposed in said throat portion in a plane substantially perpendicular to the direction of gas flow for producing a liquid spray across said throat portion transversing the direction of gas flow;
   a liquid-filled sump portion in said housing; and
   sump filter screen means dividing said sump portion into at lease a first sump section disposed beneath said gas inlet and said throat portion and a second sump section coupled to said spray means for supplying spray liquid thereto,
   whereby gas passing through said throat portion from the gas inlet to the gas outlet is increased in velocity and turbulence and scrubbed by the liquid spray and said sump filter screen means is operable to prevent particulates and other contaminants falling into said first sump section from entering said second sump section, to thereby prevent clogging of said spray means.

2. Gas scrubbing apparatus as claimed in claim 1 further comprising
   at least one gas filter basket disposed in said passageway adjacent said gas outlet for filtering the gas passing through said passageway,
   support means in said housing for slidably supporting said filter basket, and
   service door means in said housing adjacent said support means to permit removal of said filter basket from said housing.

3. Gas scrubbing apparatus as claimed in claim 2 wherein said gas filter basket comprises
   a hollow frame having one end thereof closed by a gas permeable end member,
   a cover member of gas permeable material removably disposed in the other end of said frame,
   gas filtering material disposed within said frame between said cover and end members, and
   means for securing said cover member to said frame at predetermined distances from said end member to permit adjustment of the thickness of the filter material in said basket.

4. Gas scrubbing apparatus comrising a housing having a gas inlet adjacent one end thereof, a gas outlet adjacent the other end thereof, and a liquid-filled sump portion at the bottom thereof;

baffle means in the interior of said housing cooperating with the surface of the liquid in said sump portion to form a tortuous passageway connecting the gas inlet with the gas outlet, said baffle means comprising fixed baffle means connected to said housing and at least one movable baffle spaced from said fixed baffle which defines with said fixed baffle means an adjustable throat portion of reduced cross-sectional area in said passageway;

means for adjusting said moveable baffle;

sump filter screen means dividing said sump portion into a first sump section disposed beneath said gas inlet and said throat portion and a second sump section disposed beneath said gas outlet, said sump filter screen means being operable to prevent particulates and other contaminants falling into said first sump section from entering said second sump section;

spray means mounted on said baffle means in said throat portion in a plane substantially perpendicular to the direction of gas flow and coupled to said second sump section for producing a liquid spray across said throat portion transversing the direction of gas flow, whereby gas passing through said throat portion is increased in velocity and turbulence and scrubbed by the liquid spray; and at least one gas filter basket removably disposed in said passageway adjacent said gas outlet for filtering the gas passing therethrough.

5. Gas scrubbing apparatus as claimed in claim 4 wherein said fixed baffle means comprises a fixed baffle adjacent said gas inlet for directing the gas from said inlet toward the surface of the liquid in said first sump section to provide for inertial separation of the particulates and other contaminants in said gas.

6. Gas scrubbing apparatus as claimed in claim 5 wherein said movable baffle is disposed adjacent said fixed baffle and has the lower end thereof extending below the surface of the liquid in said first sump section, the space between said fixed and movable baffles forming the throat portion of said passageway, said movable baffle being movable in a direction substantially perpendicular to the direction of gas flow between said baffles.

7. Gas scrubbing apparatus as claimed in claim 6 wherein each of said movable and fixed baffles is substantially coplanar and the plane of the movable baffle is substantially parallel to the plane of the fixed baffle.

8. Gas scrubbing apparatus as claimed in claim 6 wherein said fixed baffle is substantially coplanar, and said movable baffle has two portions disposed above the surface of the liquid in said sump portion opposite said fixed baffle, each of said movable baffle portions being substantially coplanar and inclined at an acute angle with the plane of said fixed baffle, so that the cross-sectional area of the throat portion formed by said baffles decreases to a minimum at the apex of the two inclined portions of said movable baffle to provide a smooth transition from the larger cross-sectional area of the passageway to the smaller cross-sectional area of said throat portion.

* * * * *

UNITED STATES PATENT OFFICE
CERTIFICATE OF CORRECTION

Patent No. 3,856,487      Dated December 24, 1974

Inventor(s) Manuel Perez

It is certified that error appears in the above-identified patent and that said Letters Patent are hereby corrected as shown below:

Column 4, line 27, after "34" insert --is connected to the top 23 and the two side panels 31 and 32--. Column 5, line 45, after "60" insert --,--. Column 10, line 42, delete "202" and insert therefor --203--.

Signed and sealed this 15th day of April 1975.

(SEAL)
Attest:

RUTH C. MASON
Attesting Officer

C. MARSHALL DANN
Commissioner of Patents
and Trademarks